United States Patent

Muramatsu et al.

[19]

[11] Patent Number: 5,949,749
[45] Date of Patent: Sep. 7, 1999

[54] OPTICAL DISK, REPRODUCING DEVICE AND RECORDING DEVICE THEREFOR

[75] Inventors: Eiji Muramatsu; Kunihiko Horikawa; Shoji Taniguchi, all of Saitama, Japan

[73] Assignee: Pioneer Electronic Corporation, Tokyo, Japan

[21] Appl. No.: 08/916,209

[22] Filed: Aug. 22, 1997

[30] Foreign Application Priority Data

Aug. 28, 1996 [JP] Japan .................................. 8-226900

[51] Int. Cl.⁶ ...................................................... G11B 7/00
[52] U.S. Cl. ............................ 369/59; 369/54; 369/275.4
[58] Field of Search ................................. 369/59, 47, 48, 369/49, 50, 54, 58, 32, 275.1, 275.3, 275.4, 84, 85

[56] References Cited

U.S. PATENT DOCUMENTS 5,703,858 12/1997 Mitchell et al. ...................... 369/47 X
5,809,006  9/1998 Davis et al. ........................... 369/50 X

*Primary Examiner*—Muhammad Edun
*Attorney, Agent, or Firm*—Sughrue, Mion, Zinn, Macpeak & Seas, PLLC

[57] ABSTRACT

In an optical disk, a pit train having a spatial frequency component greater than a reproduction limit defined by the modulation transfer function of a reproducing optical pickup is recorded at predetermined position and it is discriminated whether or not the optical disk is a copied duplicate by comparing a reproduced pit train with a prerecorded reference pattern.

14 Claims, 8 Drawing Sheets

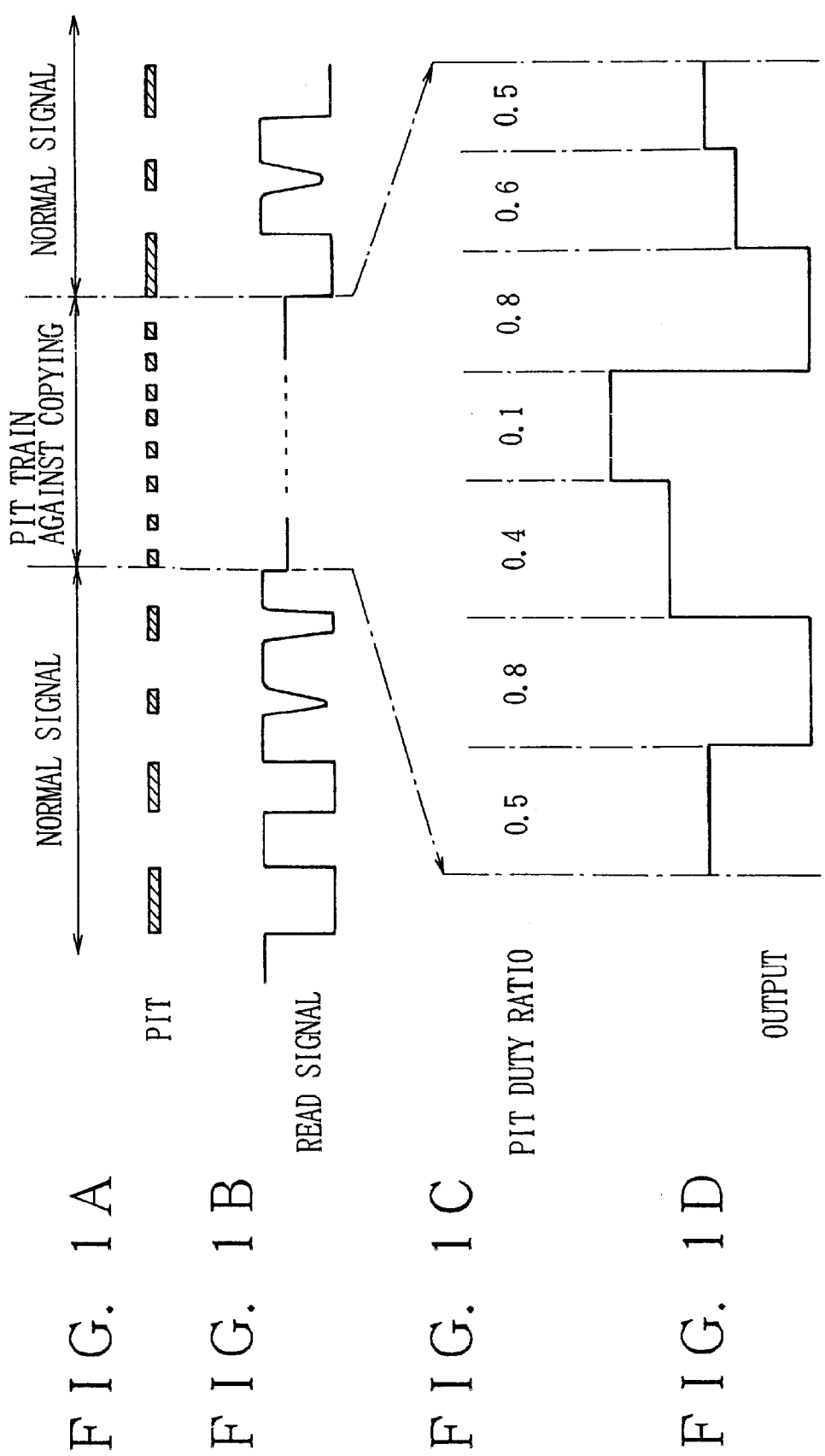

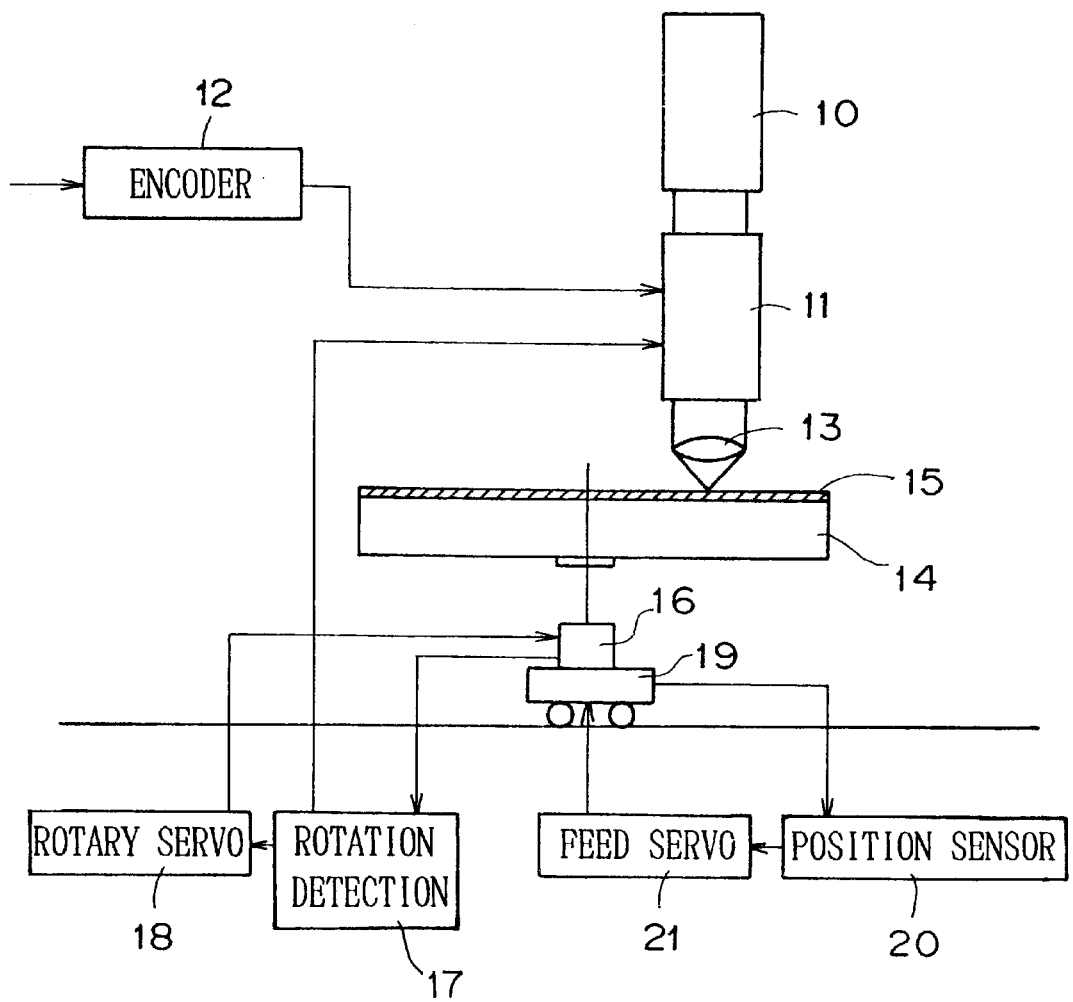

5,949,749

OPTICAL DISK, REPRODUCING DEVICE AND RECORDING DEVICE THEREFOR

FIELD OF THE INVENTION

The present invention relates to an optical disk, a reproducing device for reproducing information from the optical disk and a recording device for recording information on the optical disk.

DESCRIPTION OF THE RELATED ART

Optical disks have recently been employed as storage media, because they can store very large quantities of data and easily be produced on a large scale. Also, it is easy to reproduce recorded information from the optical disk and rerecord the reproduced signal once again onto the optical disk. Thus, duplicated optical disks have been arrived on the market. It is not easy to discriminate whether or not the optical disks on the market are copied duplicates.

It is therefore an object of the present invention to provide an optical disk capable of being discriminated to determine whether or not the optical disk is a copy or duplicate.

Another object of the present invention is to provide an optical disk reproducing device capable of discriminating whether or not the optical disk is a copied duplicate.

Still another object of the present invention is to provide an optical disk recording device capable of recording information which makes easier to determine whether or not the optical disk is a copied duplicate.

SUMMARY OF THE INVENTION

To achieve the aforementioned first objective of the present invention, there is provided an optical disk in which a pit train having spatial frequency components greater than a reproduction limit based on the modulation transfer function of an optical pick-up for reproducing information from the optical disk.

According to the present invention, a pit train having a spatial frequency component greater than a reproduction limit based on the modulation transfer function of a reproducing optical pick-up is recorded at predetermined positions. Therefore, when the information recorded on the optical is reproduced and copied, the pit train recorded at predetermined positions cannot be duplicated by copying. For this reason, it can be easily discriminated whether or not an optical disk is a duplicated one.

According to one aspect of the present invention, a duty ratio of the pit train is varied in correspondence with the binary digits 1 and 0 of a predetermined pattern signal.

According to another aspect of the present invention, the duty ratio of the pit train is varied in correspondence with an amplitude of a predetermined multi-level pattern signal.

Since the duty ratio of the pit train is varied in correspondence with the binary digits 1 and 0 of the predetermined pattern signal and that the duty ratio of the pit train is also varied in correspondence with the amplitude of the predetermined multi-level pattern signal, when a regular optical disk is reproduced, the predetermined binary or multi-level pattern is demodulated at a predetermined position of the regular optical disk at where the pit train is recorded, while neither the predetermined binary nor multi-level pattern signal is demodulated from a duplicated optical disk. For this reason, it can be easily discriminated whether or not an optical disk is duplicated.

According to still another aspect of the present invention, the pit train is recorded at the innermost circumferential portion, the outermost circumferential portion, a predetermined position or at intervals with a predetermined space in a track of the optical disk.

Since the recording position of the pit train is selected to be a predetermined position such as at the innermost circumferential portion, the outermost circumferential portion, a predetermined position, or at intervals with a predetermined space on the track of the optical disk, it is possible to discriminate whether or not the optical disk is duplicated by only referring to the recorded information at the predetermined position.

To achieve the aforementioned second objective of the present invention, a reproducing device for the aforementioned optical disk comprises a reference pattern recording section where prerecorded is a signal train which corresponds to an output signal obtained by demodulating the pit train derived from the reproducing pick-up and discriminating means for discriminating whether or not the output signal obtained by demodulating the recorded pit train at the predetermined position reproduced by the reproducing pick-up coincides with the signal train recorded on the reference pattern recording section in comparison with each other.

Since the signal train to be obtained by demodulating the pit train of the optical disk is stored in the optical disk reproducing device beforehand, and it is discriminated whether or not the prerecorded signal train coincides with the signal train obtained by demodulating the pit train at predetermined positions, it can be easily discriminated whether or not an optical disk is a duplicated disk.

To achieve the aforementioned third objective of the present invention, an optical disk recording unit for recording information on an optical disk is so constructed that a pit train having a spatial frequency component greater than a reproduction limit due to the modulation transfer function of a reproducing optical pick-up is recorded at a predetermined position of the optical disk.

Since this optical disk recording device is so constructed that the pit train having the spatial frequency component greater than the reproduction limit defined by the optical transfer characteristics of a reproducing optical pick-up is recorded at a predetermined position, it is possible to record a pit train, which can be used for discriminating whether or not an optical disk is a duplicated disk, on the optical disk.

BRIEF DESCRIPTION OF THE DRAWINGS

The above and other objects and advantages will become apparent from the following detailed description when read in conjunction with the accompanying drawings wherein:

FIGS. 1A through 1D are explanatory diagrams of the recorded information and the reproduced output of an optical disk of the present invention;

FIG. 7 is a schematic diagram showing a cutting machine employing a laser beam;

DETAILED DESCRIPTION OF THE PREFERRED EMBODIMENTS

A preferred embodiment of the present invention will hereinafter be described in detail in reference to the drawings.

Before describing an optical disk of the present invention, the principles of the invention will be described.

Figure 2A:
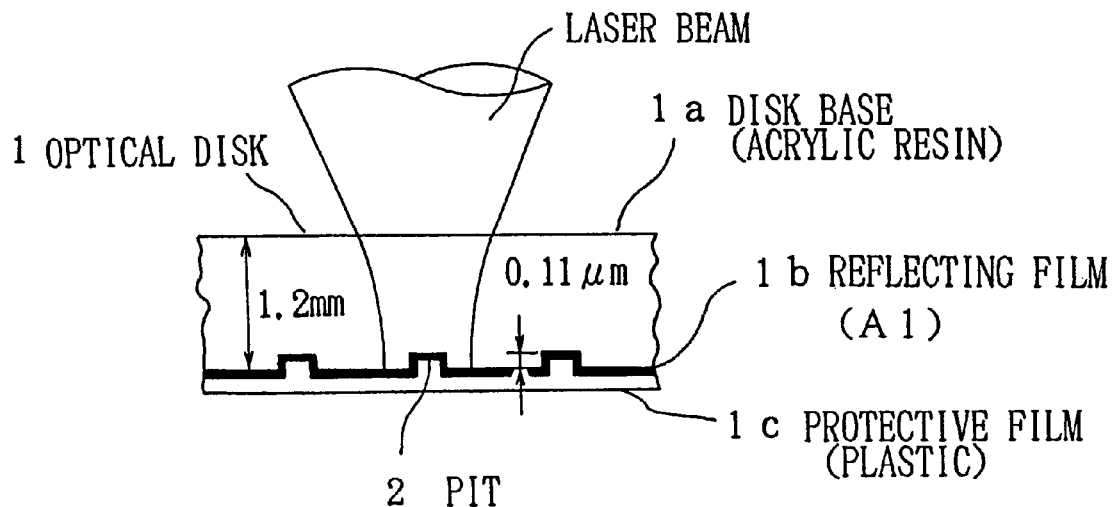
FIG. 2A is a cross sectional view showing pits formed along a track on the optical disk.
Figure 2B:
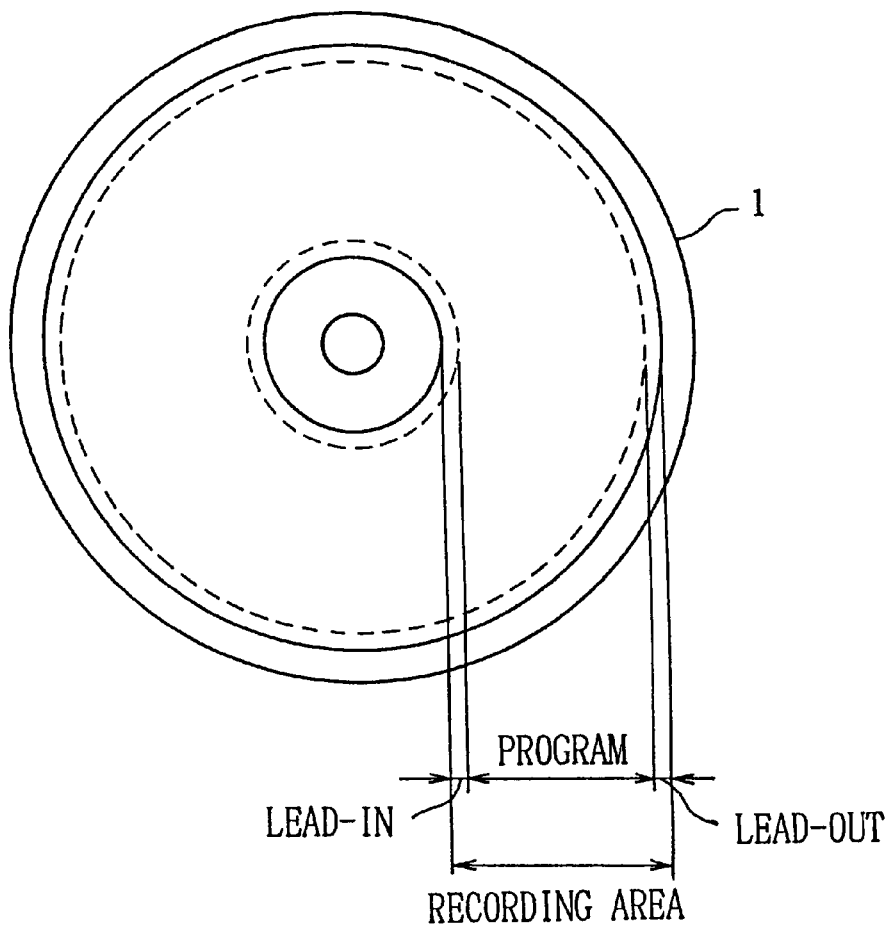
FIG. 2B is a plan view showing the optical disk on which a spiral track is formed from the inner portion toward the outer portion.

FIG. 2A shows a cross section of an optical disk, wherein an optical disk 1 consists of a disk base 1a, a reflecting film 1b and a protective film 1c. Convex and concave parts, so called pits 2, are formed spirally on the reflecting film 1c from the central portion of the disk 1 toward the outer circumference of the disk 1 as shown in FIG. 2B.

As shown in FIG. 2A, by irradiating a laser beam on the disk 1 as being focused on the surface of the concave part, it is possible to reproduce a recorded signal from the optical disk by detecting a variation in strength of a reflected laser beam, whereby the laser beam is reflected more at the concave part than the convex part or pit 2 of the optical disk.

Figure 3:
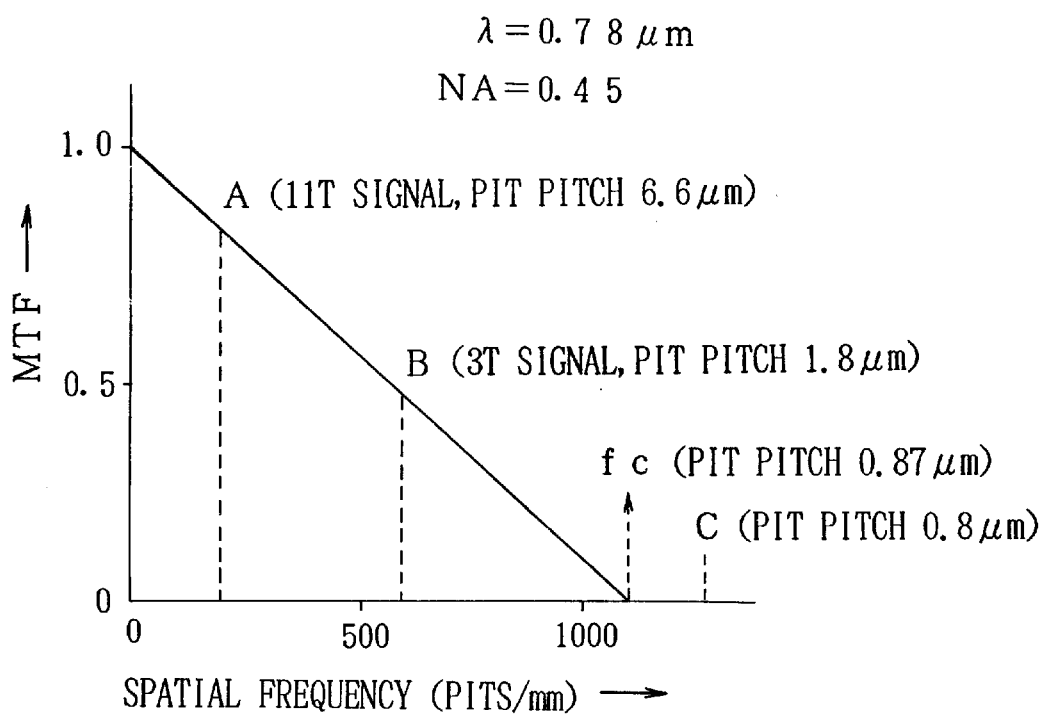
FIG. 3 is a graphic diagram showing the relationship between the spatial frequency and the modulation transfer function of the optical disk.

FIG. 3 shows an example of the modulation transfer function (hereinafter called as MTF) of the optical disk with respect to the spatial frequency when the wavelength of the laser beam is 0.78 $\mu$m and the Numerical Aperture NA (which is given by NA=sin θ, where θ is an angular aperture of an objective lens) is 0.45.

As shown in FIG. 3, if the pit pitch is increased, the MTF will approach to 1, and therefore the reproduced level will be high. If the pit pitch is reduced, the MTF will be reduced. If the pitch exceeds a certain reproduction critical frequency fc, the MTF will be zero. Signal recording is usually performed within a range indicated by the A point and B point of FIG. 3.

Figure 4A:
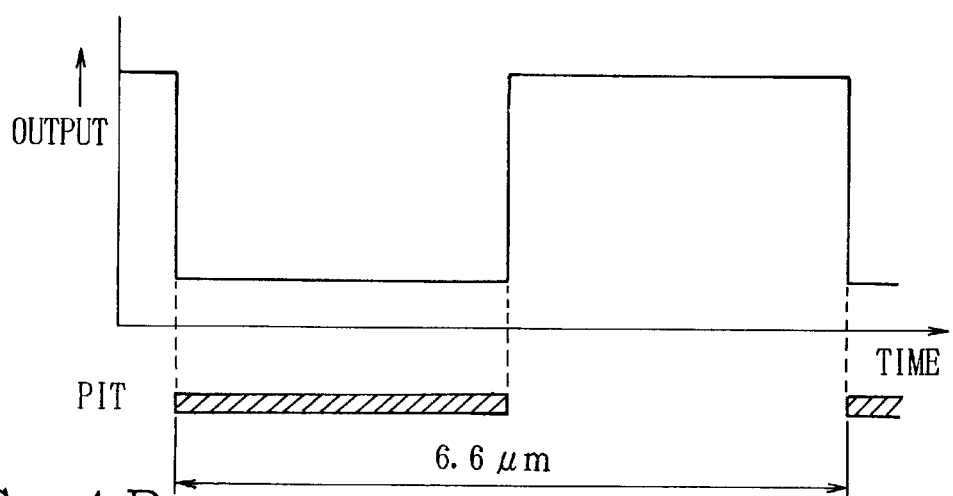
FIGS. 4A through 4C are graphic diagrams showing the relationship between the pit pitch and the reproduced output of the optical disk.
Figure 4B:
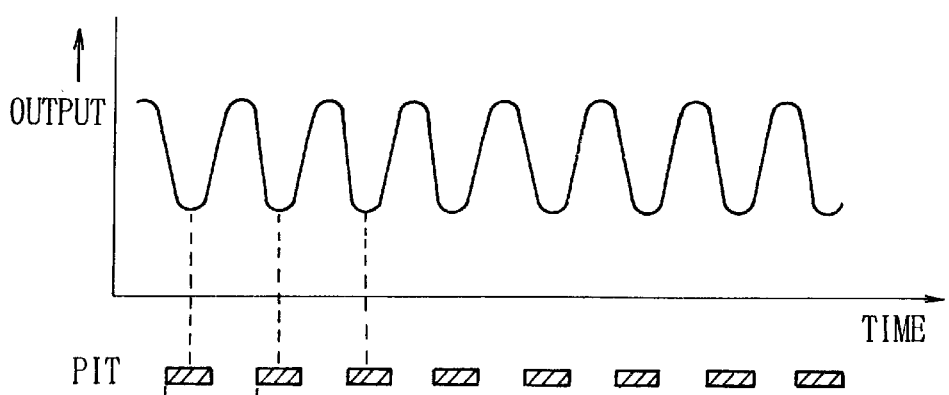
Figure 4C:
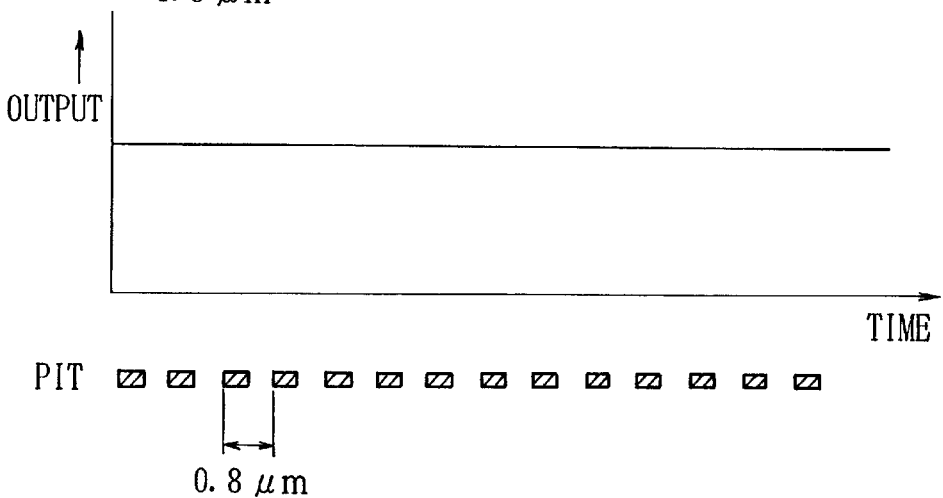

FIGS. 4A, 4B and 4C show the reproduced outputs of the optical disk in the case where pits have been recorded on the optical disk with a pit duty ratio of 0.5 and pit pitches (spatial frequencies) shown by the A, B, and C points of FIG. 3.

When the pit pitch is long (FIG. 4A), an output corresponding to the pit is obtained. If the pit pitch becomes shorter (FIG. 4B), the output corresponding to the pit will be a sine wave output. If the pit pitch exceeds the critical frequency (FIG. 4C), the output corresponding to the pit will be a DC output.

Therefore, in the case when the optical disk is reproduced and a duplicated disk is made, if it is reproduced in accordance with the states of FIGS. 4A and 4B, a pit train can be recorded on the optical disk. However, if it is reproduced in accordance with the state of FIG. 4C, a pit train cannot be recorded on the optical disk. The optical disk of the present invention is prepared in such a manner that a pit train can be recorded on the optical disk with a pit pitch greater than the reproducible critical frequency fc, as shown in FIG. 4C. In this way, it is easily discriminated whether or not an optical disk is a duplicated disk.

Figure 5A:
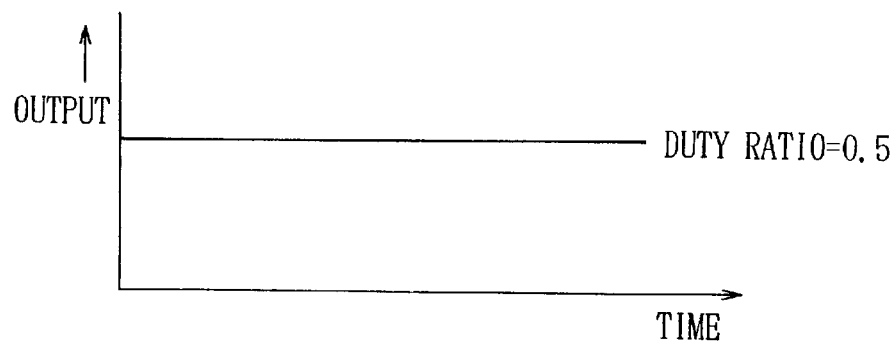
FIGS. 5A through 5C are graphic diagrams showing the reproduced output of the optical disk in the case where the duty ratio of the pits is varied at a pit pitch which exceeds the critical frequency.
Figure 5B:
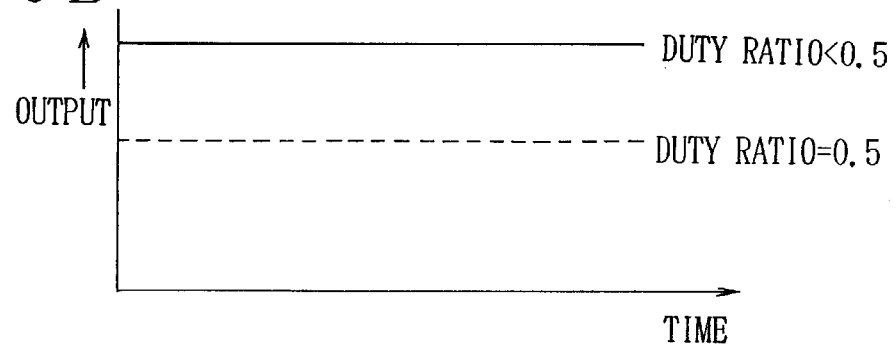
Figure 5C:
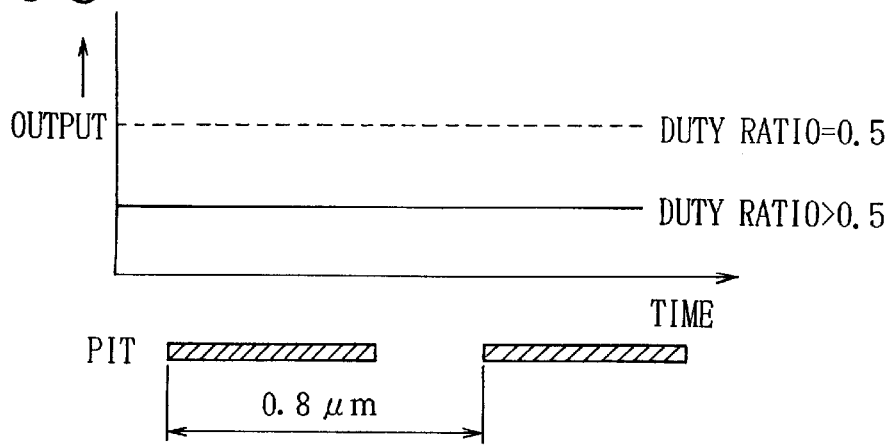

Also, FIGS. 5A, 5B and 5C show the reproduced outputs of the optical disk when a pit train is formed with such a pit pitch greater than the critical frequency, wherein FIG. 5A shows the case having the pit duty ratio of 0.5, FIG. 5B shows the case having the pit duty ratio of less than 0.5 and that FIG. 5C the case having the pit duty ratio of greater than 0.5.

Figure 6:
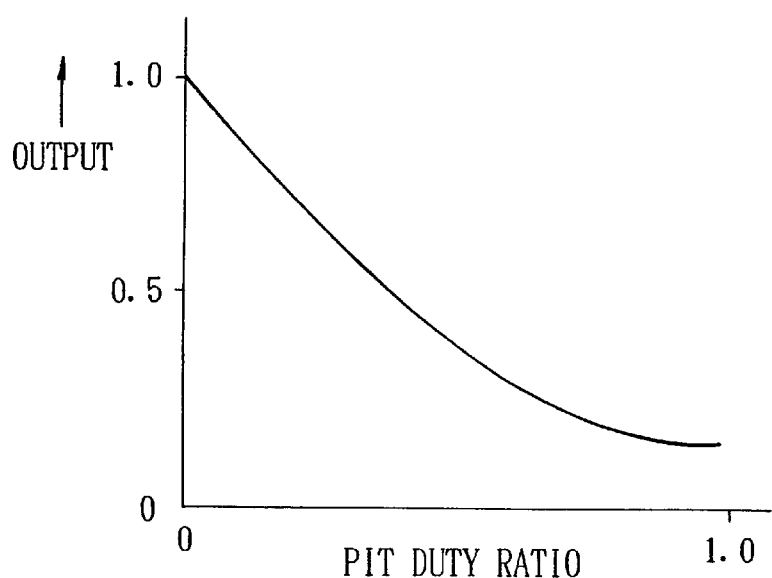
FIG. 6 is a graphic diagram showing the relationship between the duty ratio of the pits and the reproduced output voltage of the optical disk.

If the pit train is formed with a pitch greater than the critical frequency, the reproduced output is not an output varying correspondingly to the pit but an output of DC value. However, if the pit duty ratio is varied, the DC output value may vary in correspondence with the varying duty ratio, as shown in FIG. 6.

Therefore, in the optical disk of the present invention, a pit train having a spatial frequency component greater than the reproducible critical frequency defined by the MTF of a reproducing optical pick-up is recorded at a predetermined position as a countermeasure against copying, as shown in FIG. 1.

According to the optical disk of the present invention, as shown in FIG. 1, a pit train having a spatial frequency which is higher than the critical frequency of the optical reproducing pick up defined by the MTF is recorded at a predetermined position of the optical disk for providing a countermeasure against copying. FIG. 1A shows an example wherein a pit train for providing the countermeasure against copying is recorded at a predetermined position the normal signals, FIG. 1B shows a reproduced wave form, FIG. 1C shows a pit duty ratio of the pit train for the countermeasure against copying and FIG. 1D shows the reproduced output.

In the embodiment of the present invention, while a pit train for the countermeasure against copying has been recorded at predetermined position of the normal signal, the pit train may also be recorded, as shown in FIG. 2B, at the innermost circumferential position, the outermost circumferential position of the optical disk, or at positions of predetermined intervals of the track. Further, in the embodiment, the pit duty ratio of the pit train for the countermeasure against copying has been varied by two or more multi-values, however, the pit duty ratio may also be fixed to a single value or it may also be selected to be binary values for varying therebetween.

In order to fabricate the optical disk having the aforementioned structure, a glass base plate is coated with a resist film. Then, the coated resist film is exposed to a laser beam, and a laser cutting operation is performed to make a master stamper.

In FIG. 7 there is shown a cutting machine to be used in the aforementioned laser cutting operation.

In the figure, reference numeral 10 denotes a high power output laser generator. A laser beam emitted by this laser generator 10 is optically modulated by an optical modulator 11 in accordance with land cutting information fed from an encoder 12. After this optical modulation, the laser beam is collimated and focused by an objective lens 13 to focus a spot on the surface of a resist film 15 coated on the glass base 14.

The glass base 14 is set onto a spindle motor 16 so as to be rotatable by the spindle motor 16. The spindle motor 16 is rotated at a constant linear velocity with use of a rotation detector 17 and a rotary servo control circuit 18. Furthermore, the spindle motor 16 can be moved in a radial direction of the glass base 14 by using a feed unit 19.

Therefore, by controlling the feeding of the spindle motor 16 in the radial direction of the glass base 14 at a predetermined feeding speed by utilizing a position sensor 20 and feed servo control circuit 21, land portions are cut spirally on the resist film of the glass base 14 from the central portion of the disk toward the outer circumferential portion of the disk.

Figure 8:
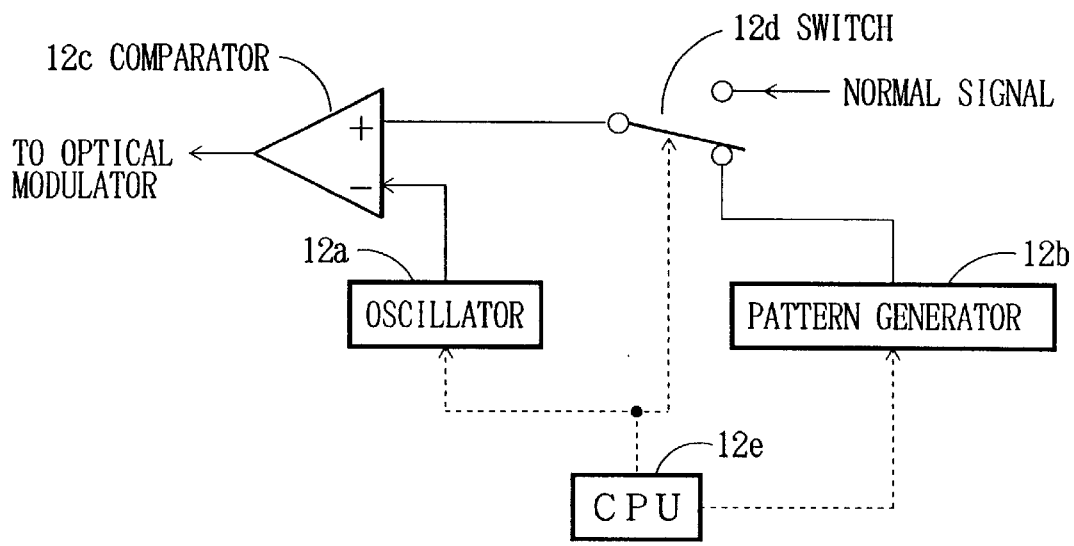
FIG. 8 is a block diagram showing an encoder of FIG. 7.

FIG. 8 schematically shows the structure of the encoder 12 of FIG. 7. The encoder 12 consists of an oscillator 12a, a pattern generator 12b, a comparator 12c, a switch 12d and a central processing unit (CPU) 12e for the control.

In cutting a normal signal, the CPU 12 switches the switch 12d to the normal signal input side for inputting a normal signal into the comparator 12c, and also causes the oscillator 12a to generate a predetermined frequency within a range of the aforementioned critical frequency.

With respect to the pit train for the countermeasure against copying, the CPU 12e switches the switch 12d to the side of the pattern generator 12b and also causes the oscillator 12a to generate a predetermined frequency higher than the critical frequency.

The pattern that will be generated by the pattern generator 12b may have multiple values such as shown in FIG. 1D or two values.

If the output of the oscillator 12a and the output of the pattern generator 12b are fed to the comparator 12c, the output of the comparator 12c will be a sliced output waveform having the pit duty ratio varied in correspondence with the output voltage of the pattern generator 12b. With this output, the laser modulator 11 is driven for providing the cutting.

Figure 9:
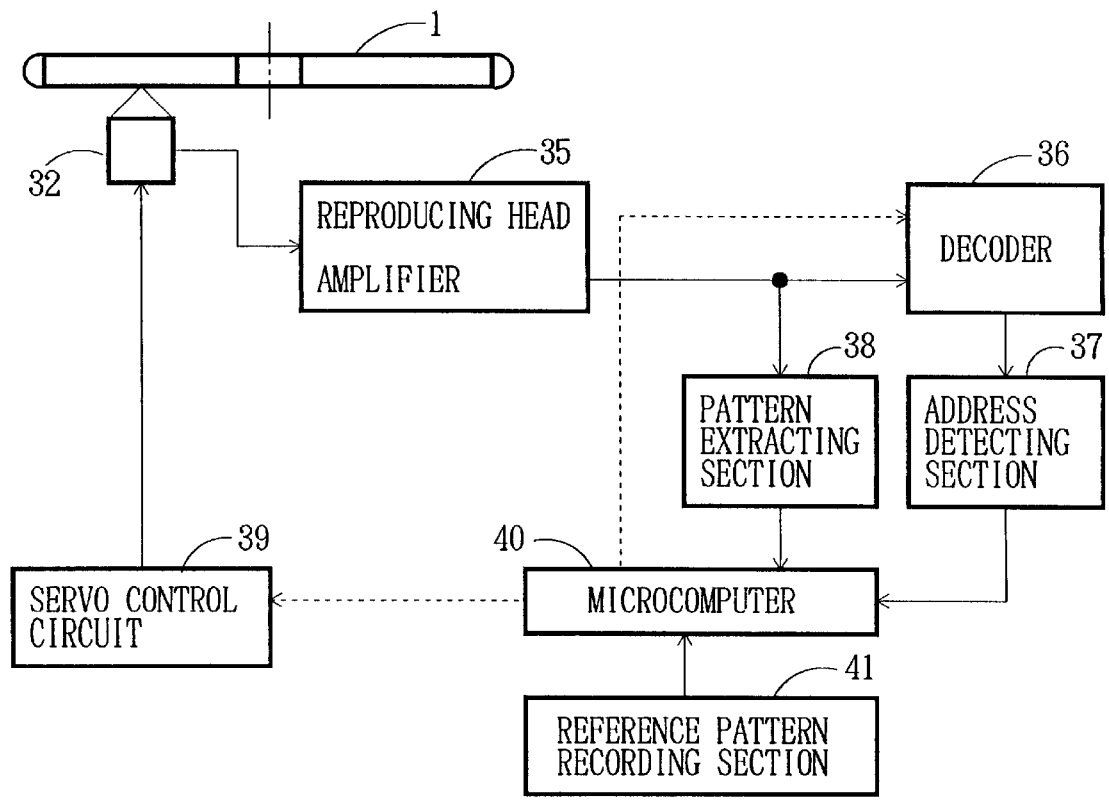
FIG. 9 is a block diagram showing a reproducing device for reproducing information from the optical disk.

FIG. 9 schematically shows a reproducing device which reproduces information from the optical disk fabricated in accordance with the aforementioned method. In the figure, the reproducing device comprises an optical pick-up 32, a reproducing head amplifier 35, a reproducing decoder 36, an address detecting section 37, a pattern extracting section 38, a servo control circuit 39, a microcomputer 40 and a reference pattern recording section 41.

The reference pattern recording section 41 is prerecorded with a pattern signal which is the same pattern signal as being obtained when the pit duty ratio of the pit train for the countermeasure against copying prerecorded on the optical disk is varied.

The pattern extracting section 38 supplies an output of the reproducing head amplifier 35 to the microcomputer 40 after shaping an envelope thereof.

The microcomputer 40 is controlled so that information on the optical disk 1 is reproduced. When information is reproduced at the predetermined position where a pit train for the countermeasure against copying has been recorded, it is discriminated whether or not the reproduced pattern derived from the pattern extracting section coincides with the stored pattern at the reference pattern recording section 41 by comparing with each other, whereas if the two patterns do not coincide with each other, it is decided that the optical disk under reproducing is a duplicated disk and the microcomputer will give warnings to the operator by an alarm or display and stop the reproducing operation.

Figure 10:
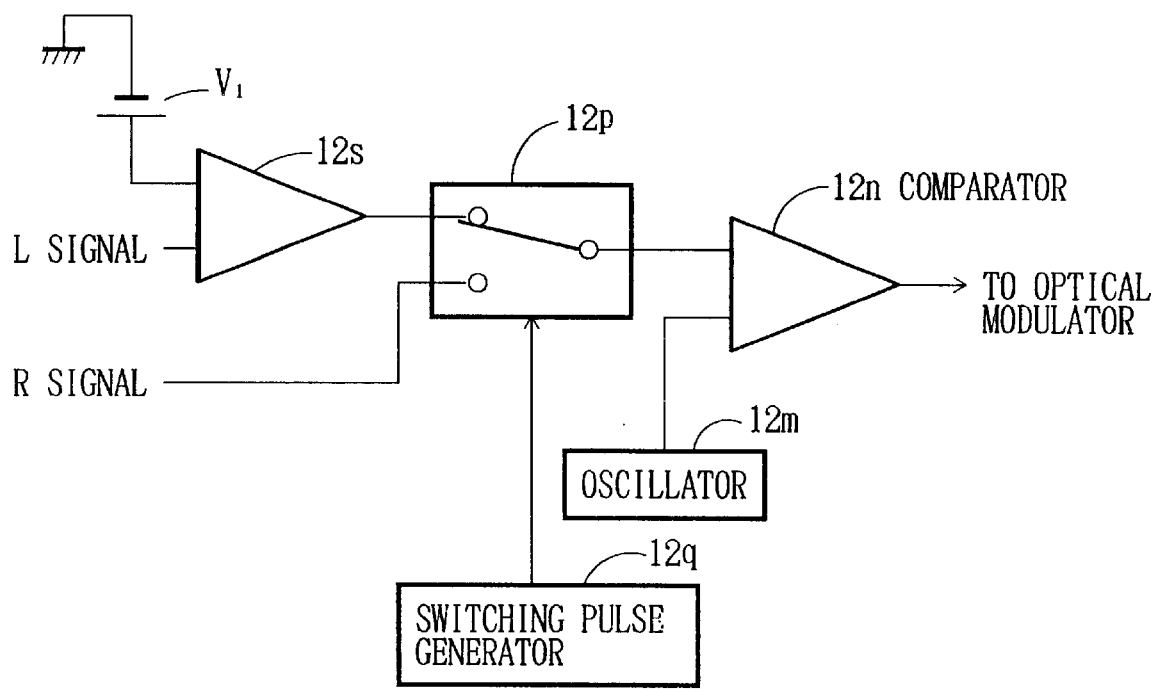
FIG. 10 is a block diagram showing an encoder for recording L and R stereo signals.

FIG. 10 shows an encoder which records L and R stereo sound signals by employing a pit train having a pit pitch which is greater than the aforementioned critical frequency. In the figure, the element 12e is an encoder for adding a bias voltage $V_1$ to the L signal, the element 12p is a switch for providing switching operation between the L signal added to the bias voltage $V_1$ and the R signal and outputting the switched signal, the element 12q is a switching pulse generator for generating a switching pulse for the switch 12p, the element 12h is a comparator and the element 12m is an oscillator.

The oscillator 12m oscillates a frequency higher than the aforementioned critical frequency, for example, 2.5 MHz. Also, the switching pulse generator 12q oscillates a frequency at least two times higher than the maximum frequency contained in the L and R signals and less than one half of the oscillated frequency of the oscillator 12m, for example, 300 KHz.

Figure 11:
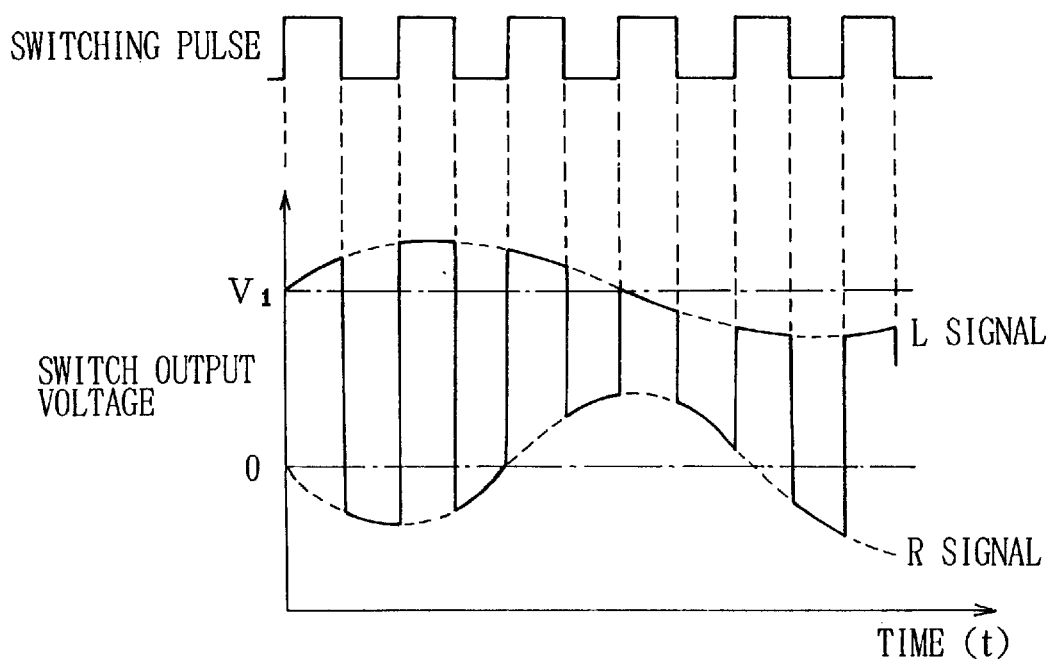
FIG. 11 is a graphic diagram showing the output voltage of the switch of FIG. 10.

FIG. 11 shows the output of the switch 12p. The L and R signals are outputted in correspondence with the ON and OFF of the switching pulse generated by the switching pulse generator 12q and are fed to the comparator 12n.

Therefore, an output of the comparator 12n is equal to the oscillated frequency of the oscillator 12m, and the duty ratio varies in correspondence with the output voltage from the switch 12p for forming pits on the optical disk by turning the laser beam ON and OFF with the optical modulator 11. If information is reproduced from the optical disk fabricated in the aforementioned way, an output signal shown in FIG. 11 will be obtained, and L and R stereo signals can be reproduced by separating envelopes at upper and lower sides of the output signal.

As previously described, the present invention has the following advantages.

A pit train having a spatial frequency component greater than a reproduction limit defined by the modulation transfer function of a reproducing optical pick-up is recorded at a predetermined position. Therefore, when the information recorded on the optical disk is reproduced and copied, the pit train recorded at the predetermined position cannot be duplicated. For this reason, it can be easily discriminated whether or not an optical disk is a copied duplicate.

Further, according to the present invention, since the pit duty ratio of the pit train is varied in correspondence with the binary digits 1 and 0 or multiple values of a predetermined pattern signal, the pattern having two predetermined values or predetermined multiple values is demodulated at a predetermined position where a pit train is recorded when the regular optical disk is played back, while such predetermined pattern is not demodulated from a copied duplicate of the regular optical disk. For this reason, it can be easily discriminated whether or not an optical disk is a copied duplicate.

In addition, since a pit train is recorded at the innermost circumferential position, the outermost circumferential position, a predetermined position or positions at predetermined intervals on a track of the optical disk, it is possible to discriminate whether or not an optical disk is a copied duplicate based only on the information recorded at a predetermined position of the optical disk.

Furthermore, a signal train, which can be obtained when the pit train of the optical disk is demodulated, is recorded in a reproducing device of an optical disk in advance and it is discriminated whether or not a signal obtained by demodulating the information recorded at the predetermined position coincides with the signal train prerecorded in the reproducing device. Therefore, it can be easily discriminated whether or not an optical disk is a copied duplicate.

Moreover, since the optical disk recording unit is constructed so that a pit train having a spatial frequency component greater than a reproduction limit defined by the modulation transfer function of a reproducing optical pick-up can be recorded at predetermined positions. Therefore, it is possible to record a pit train with which it can be discriminated whether or not an optical disk is a copied duplicate.

While the present invention has been described with reference to the preferred embodiments thereof, the invention is not to be limited to the details given herein, but may be modified within the scope of the appended claims.

What is claimed is:

1. An optical disk wherein a pit train having a spatial frequency component greater than a reproduction limit defined by the modulation transfer function of a reproducing optical pick-up is recorded at a predetermined position.

2. The optical disk as set forth in claim 1, wherein a pit duty ratio of said pit train is varied in correspondence with the binary digits 1 and 0 of a predetermined pattern signal.

3. The optical disk as set forth in claim 1, wherein a duty ratio of said pit train is varied in correspondence with an amplitude of a predetermined multi-level pattern signal.

4. The optical disk as set forth in claim 1, 2, or 3, wherein said pit train is recorded at the innermost circumferential position, the outermost circumferential position, a predetermined position, or positions at predetermined intervals on a track of the optical disk.

5. A reproducing device for the optical disk as set forth in claim 1, comprising:
   a reference pattern recording section prerecorded with a signal train corresponding to an output signal obtained by demodulating said pit train derived from said reproducing pick-up; and
   discriminating means for discriminating whether or not the output signal demodulated a reproduced signal at said predetermined position through said reproducing pick-up coincides with the signal train recorded on said reference pattern recording section by comparing them with each other.

6. A recording device for recording information on an optical disk, wherein a pit train having a spatial frequency component greater than a reproduction limit defined by the modulation transfer function of a reproducing optical pick-up can be recorded at a predetermined position of the optical disk.

7. An optical disk comprising:
   a disk base;
   a reflecting film formed on the disk base;
   a pit train formed on the reflecting film including a plurality of concave parts, the concave parts having a pit pitch greater than a reproduction limit defined by a modulation transfer function of a reproducing optical pick-up.

8. The optical disk of claim 7, wherein a pit duty ratio of said pit train is varied in correspondence with the binary digits 1 and 0 of a predetermined signal pattern.

9. The optical disk of claim 7, wherein a pit duty ratio of said pit train is varied in correspondence with an amplitude of a predetermined multi-level signal pattern.

10. The optical disk of claim 7, wherein said pit pitch is great than 0.87 $\mu$m.

11. A recording device for recording information on an optical disk with a resist and glass base comprising:
    a laser generator for generating a laser beam;
    an optical modulator for optically modulating the laser beam;
    an objective lens for focusing the optically modulated laser beam on the resist film; and
    an encoder controlling said optical modulator to optically modulate the laser beam to cut land portions on the resist film of the glass base to form a pit train including a number of concave parts, the concave parts having a pit pitch greater than a reproduction limit defined by a modulation transfer function of a reproducing optical pick-up.

12. The recording device of claim 11, wherein the encoder further comprises:
    a comparator connected to the optical modulator;
    an oscillator connected to the comparator;
    a pattern generator generating a pattern to be supplied to the comparator; and
    a processor controlling the oscillator to generate a predetermined frequency greater than the reproduction limit defined by the modulation transfer function and controlling the pattern generator to be input to the comparator, wherein
    the comparator outputs a signal a sliced waveform having a pit duty ratio that is varied in correspondence with the output of the pattern generator.

13. A reproducing device for optical disks comprising:
    an reproducing pick-up;
    a pattern extracting section supplying an output signal from the reproducing pick-up;
    a reference pattern recording section provided with a signal train corresponding to an output signal obtained from demodulating a pit train including a number of concave parts, the concave parts having a pit pitch greater than a reproduction limit defined by a modulation transfer function of the reproducing optical pick-up derived from the reproducing optical pick up; and
    a processor for receiving the supplied output signal from the extracting section and for determining whether or not the supplied signal coincides with the signal train.

14. The reproducing device of claim 13, wherein the supplied output signal is obtained from a duplicate disk if the supplied signal and signal train do not coincide.

* * * * *